(12) United States Patent
Hinderling et al.

(10) Patent No.: US 10,921,449 B2
(45) Date of Patent: Feb. 16, 2021

(54) DYNAMIC EXPANSION OF A DISTANCE MEASURING DEVICE HAVING A VARIABLE OPTICAL ATTENUATION ELEMENT IN THE TRANSMITTING CHANNEL

(71) Applicant: HEXAGON TECHNOLOGY GENTER GMBH, Heerbrugg (CH)

(72) Inventors: Jürg Hinderling, Marbach (CH); Julien Singer, Berneck (CH); Simon Bestler, Langenargen (DE)

(73) Assignee: HEXAGON TECHNOLOGY GENTER GMBH, Heerbrugg (CH)

( * ) Notice: Subject to any disclaimer, the term of this patent is extended or adjusted under 35 U.S.C. 154(b) by 589 days.

(21) Appl. No.: 15/494,168

(22) Filed: Apr. 21, 2017

(65) Prior Publication Data
US 2017/0307757 A1     Oct. 26, 2017

(30) Foreign Application Priority Data

Apr. 22, 2016   (EP) ..................................... 16166679
Apr. 7, 2017    (EP) ..................................... 17165503

(51) Int. Cl.
*G01S 7/48*        (2006.01)
*G01S 17/10*       (2020.01)
(Continued)

(52) U.S. Cl.
CPC .............. *G01S 17/10* (2013.01); *G01S 7/484* (2013.01); *G01S 7/4817* (2013.01);
(Continued)

(58) Field of Classification Search
None
See application file for complete search history.

(56) References Cited

U.S. PATENT DOCUMENTS 5,260,762 A * 11/1993 Telle ..................... G01S 7/4811
                                                        356/28
7,030,958 B2    4/2006 Luijkx et al.
(Continued)

FOREIGN PATENT DOCUMENTS

| CN | 1641414 A | 7/2005 |
| CN | 103234515 A | 8/2013 |
(Continued)

OTHER PUBLICATIONS

European Search Report dated Oct. 19, 2016 as received in Application No. 16166679.7.
(Continued)

*Primary Examiner* — Hovhannes Baghdasaryan
(74) *Attorney, Agent, or Firm* — Maschoff Brennan

(57) ABSTRACT

A measuring device, in particular a tachymeter, laser scanner, profiler, or laser tracker, having an electronic laser distance measuring module, which comprises an optical transmitting channel having a transmitting unit and an optical receiving channel having a receiving unit for laser measuring radiation, wherein the beam guiding in the electronic laser distance measuring module is implemented by means of fiber optics, and wherein a settable attenuation unit based on an optically active crystal for attenuating the laser measuring radiation generated by the transmitting unit is provided in the optical transmitting channel.

15 Claims, 7 Drawing Sheets

(51) Int. Cl.
*G01S 7/481* (2006.01)
*G01S 7/484* (2006.01)
*G01S 7/4861* (2020.01)
*G01S 17/42* (2006.01)
*G01S 7/486* (2020.01)
*G01S 17/66* (2006.01)

(52) U.S. Cl.
CPC ......... *G01S 7/4818* (2013.01); *G01S 7/4861* (2013.01); *G01S 7/4868* (2013.01); *G01S 17/42* (2013.01); *G01S 17/66* (2013.01)

(56) References Cited

U.S. PATENT DOCUMENTS

| | | |
|---|---|---|
| 7,480,316 B2 | 1/2009 | Gachter et al. |
| 7,920,248 B2 | 4/2011 | Satzky et al. |
| 8,786,834 B2 | 7/2014 | Hayashi et al. |
| 2007/0121446 A1* | 5/2007 | Shiozawa ............ G11B 7/126 369/47.5 |
| 2009/0195770 A1 | 8/2009 | Satzky et al. |
| 2015/0309175 A1* | 10/2015 | Hinderling ............ G01S 7/4813 356/4.01 |

FOREIGN PATENT DOCUMENTS

| | | |
|---|---|---|
| CN | 105136062 A | 12/2015 |
| EP | 1 517 415 A1 | 3/2005 |
| EP | 1 876 469 A1 | 1/2008 |
| EP | 1876469 A1 | 1/2008 |
| EP | 2 937 665 A1 | 10/2015 |
| EP | 2937665 A1 | 10/2015 |
| JP | H08122435 A | 5/1996 |
| JP | 2011-064609 A | 3/2011 |

OTHER PUBLICATIONS

European Search Report dated Sep. 13, 2017 as received in Application No. 17165503.8.

\* cited by examiner

DYNAMIC EXPANSION OF A DISTANCE MEASURING DEVICE HAVING A VARIABLE OPTICAL ATTENUATION ELEMENT IN THE TRANSMITTING CHANNEL

FIELD OF THE INVENTION

The invention relates to a measuring device, in particular a tachymeter, laser scanner, profiler, or laser tracker, having an electronic laser distance measuring module, which comprises an optical transmitting channel having a transmitting unit and an optical receiving channel having a receiving unit for laser measuring radiation, wherein an attenuation unit for an attenuation of the laser measuring radiation generated by the transmitting unit is provided in the optical transmitting channel.

BACKGROUND

Optical attenuation units or attenuators of the type in question are used in particular in electronic distance measuring modules (EDM). The distance measuring modules are assemblies, for example, in products such as theodolites, scanners, LIDAR, profilers, laser trackers, or also in automobiles.

The strength of the received signal is determined, on the one hand, by the distance range to be covered and, on the other hand, by the differing reflectivity of the surfaces of the object to be measured. In particular objects having mirrored or glossy surfaces generate very different signal amplitudes in the receiving unit of the distance meter depending on the angle of incidence of the optical measuring beam.

In typical applications, a large distance range to be defined from less than 1 m to up to multiple kilometers is covered, wherein strongly diffuse light-scattering target objects having extremely little backscatter and also prismatic target objects having retroreflection and ultrahigh optical quality, and accordingly high-intensity reflected radiation, are to be measured.

The target objects to be measured are often made of plastic or metal having glossy surfaces, the signal strength of the scattered light back to the distance measuring unit is therefore very low, or excessively strong in the case of reflection directly back. In the first case, the received signal merges into the noise and is not analyzable. In the second case, the receiving channel is overloaded and the distance measurement becomes excessively inaccurate, because the signal runtime of the receiver and/or the signal shape change.

One of the special requirements for the use of an attenuator in an EDM is therefore a very large setting range from very low to extremely high optical densities of at least 5.0 (=$10^5$), typically linked to an exponential curve of the transmission between these two extreme states. The exponential curve means that the attenuation decreases or increases by a multiplicative factor and not an additive factor.

The main problem is additionally the time necessary to set the required signal amplitude. In conventional distance measuring devices, the signal setting time is typically 1 ms or longer. If the distance measuring device is in a scanning mode, measuring data are then generated at a rate from 100 kHz up to multiple megahertz. In general, 3D coordinates are presently output or stored at a rate of 1 MHz. So as not to miss any measuring points on the object to be measured, signal dynamic regulation having a setting speed of better than 1000 ns, preferably 300 ns or 100 ns is therefore required.

Distance measuring sensors for geodetic or industrial measuring instruments have heretofore solved the problem of amplitude dynamics very differently. Diverse solution approaches and methods are known from the literature, wherein most solutions describe signal setting devices in the receiving channel.

Known attenuators from the prior art consist, for example, of a gray filter wheel, which is mechanically driven and has a linear or exponential grayscale curve. Thus, for example, in a first step of the measuring procedure, the signal strength is measured coarsely, whereupon an optical grayscale is moved to regulate the signal amplitude to a most optimal possible value or at least in a calibrated signal range, so that the distance measurement is of higher quality. Instead of a grayscale, MEMS-based, mirror-based, or aperture-based electronically moved signal attenuators are also known, which act on the free beam, i.e., on received light which is not fiber-guided.

Such an attenuator is generally located in the optical receiving channel of an EDM, this is done primarily to keep possible background light away from the receiver. An attenuator in the optical transmitting channel can also have advantages, however, as described hereafter.

Further known attenuators are based, for example, on electro-optical attenuators or spatial modulators, for which diverse technologies are known. In addition to devices based on liquid crystals, for example, EP 2 937 665, magneto-optical, semiconductor-based "Multiquantum Well" arrangements or deformable mirrors for example have also been proposed for use as attenuators.

Arrangements based on liquid crystal technology (producer: Boulder Nonlinear Systems) and MEMS-based micrometer technology (producer: Texas Instruments) have heretofore primarily found use in commercial measuring instruments; such an arrangement for an attenuator is also disclosed in U.S. Pat. No. 8,786,834.

Non-optical signal attenuation is also conceivable, for example, signal attenuation in the electrical part of the signal path. In this case, the activation of the light-emitting laser diode, for variation of the generated output light intensity, control of the APD gain of the receiving diode, and the activation of the electrical amplifier stages up to the analog-to-digital converter come into consideration.

These attenuation options have also previously been used, however, in general only as a supplementary function and not as the sole function for signal attenuation; because the signal dynamic response which is to be managed using a distance measuring module exceeds the possibilities for these electrical attenuation methods, even if they are combined. For example, the signal of reflective objects is at least 1 million times stronger than that from a dark diffusive object surface. Electrical receiving circuits of the above-mentioned type achieve dynamics in the range of approximately three orders of magnitude.

Optical attenuators are linear with respect to signal-transmission-technology behavior, i.e., they are linear both in phase (runtime) and also in amplitude; and the transmitted signals are undistorted, which is advantageous for a high measurement accuracy of an EDM module.

The most frequently used optical amplifiers are the fiber amplifiers such as EDFA (erbium-doped fiber amplifier) or YDFA (ytterbium-doped fiber amplifier). The amplification or attenuation can be set by means of pump laser diodes, which emit the energy thereof into the fiber core of the amplification unit. The switching or setting times are typically several hundred microseconds and are therefore not sufficiently rapid.

Further attenuators or amplifiers are based, for example, on photodiodes having settable gain. Avalanche photodiodes (APD) or also phototransistors are particularly suitable for rapid setting of the signal amplification and thus for controlling the signal amplitude.

Multichannel receivers are also used, which allocate the received signal of a photodiode or a photodiode array to multiple electronic receiving channels, for example. Each of these receiving channels has a different signal amplification, wherein the channel signal having the optimum amplitude is selected and supplied to the time measuring circuit practically in real time by means of a downstream multiplexer (MUX). However, this method has the disadvantage that the signal offset jumps due to the switching and therefore interference is added to the actual signal.

A further known method operates by means of electronically settable gain (variable gain amplifier=VGA). This solely electronic method is probably the simplest and therefore is a very frequently used implementation for signal control. A special electronic circuit or a switching component in the receiving signal channel adapts the signal amplitude so that, for example, the signal amplitude is in the specified operating range at the relevant input of the time measuring circuit (such as ADC/FPGA or TDC). A reliable and accurate distance measurement can thus be achieved.

In the case of optical fiber amplifiers such as EDFA or YDFA, the amplification or attenuation can be varied over a range of approximately a factor of 100. One advantage is obtaining the high beam quality, in particular, the radiation is practically spatially diffraction-limited in the case of amplifiers having monomodal fibers. The setting time for amplification or attenuation is excessively slow for the object to be achieved and is approximately 500 µs.

The optical pulse level of laser diodes can be set directly by the current amplitude. In certain devices, the emitted transmission power is therefore also adapted. The signal dynamic range thus obtained is only 10 to 50, however.

In conventional distance measuring devices having high amplitude dynamic range, in spite of all measures, either the receiving photodiode (APD, PIN) or the electronics of the receiving channel reach their limits. On the one hand, the gain of an APD can only be set in a narrow range, on the other hand, the change of the transit time (delay, phase) which is linked to a gain setting cannot be calibrated sufficiently exactly. In particular distance measurement which is high precision, has micrometer accuracy, and at the same time has megahertz speed is thus not possible.

The device according to the invention is to achieve the signal dynamics of a distance measuring unit by at least the factor of 1000 with a setting speed of faster than 500 ns. In contrast thereto, all of the proposed solutions have the disadvantage that the signal amplitude setting (attenuation, amplification) is either excessively slow or has an excessively small dynamic range.

SUMMARY

Some embodiments of the invention provide a measuring device having an improved laser distance measuring module, which enables a distance measurement of better than 500 µm with an increased laser scan rate, in particular a rate of 100 kHz up to several megahertz, in particular for a measuring device which measures without reflectors.

Some embodiments of the invention is to provide a measuring device having an improved laser distance measuring module, having an expanded usage range with respect to amplitude dynamics and a stable measuring rate (scan rate) without interruptions due to undermodulated or overmodulated signal amplitudes.

Some embodiments of the invention provide a measuring device having a laser distance module which is improved with respect to robustness and calibration ability, in particular an improved laser distance module which can be used within a large temperature range.

These objects are achieved by the implementation of the characterizing features of the independent claim. Features which refine the invention in an alternative or advantageous manner can be inferred from the dependent Patent Claims.

The invention relates to a measuring device, in particular a tachymeter, laser scanner, profiler, or laser tracker, for scanning uncooperative objects, in particular natural objects, moreover also for scanning cooperative objects such as reflectors, having an electronic laser distance measuring module, which comprises an optical transmitting channel having a transmitting unit for generating laser measuring radiation and an optical receiving unit having a receiving unit for reflected laser measuring radiation. The beam guiding in the electronic laser distance measuring module is implemented by means of a fiber optic, in particular consisting of monomodal fibers; and the optical transmitting channel of the laser distance measuring module contains an attenuation unit for attenuation of the laser measuring radiation generated by the transmitting unit.

The transmitting unit progressively generates modulated, in particular pulsed, transmitted signals having a modulation rate higher than 100 kHz, in particular several megahertz to gigahertz during the scanning, and the attenuation unit is designed such that an electrically controllable setting of at least two different attenuation factors is provided, wherein the attenuation unit is continuously activatable from transmitted signal to transmitted signal, so that the reflected received signal is adapted with respect to a single immediately preceding received signal pulse or with respect to multiple successive immediately preceding received signal pulses. The attenuation unit according to the invention is thus activated in such a way that a setting of the attenuation unit at different attenuation factors takes place in such a way that the receiving unit is supplied with a received signal having an amplitude in the linear dynamic range of the receiving unit, based on a single immediately preceding received signal pulse or based on multiple successive immediately preceding received signal pulses. During the scanning, a setting of the attenuation unit using different attenuation factors is thus carried out at an attenuation setting rate which is at least equal to, for example, a reference measuring rate of the laser distance measuring module based on a hypothetically achievable distance measuring rate of the laser distance measuring module for a laser distance measurement having a hypothetical amplitude in the linear dynamic range of the receiving unit.

According to the present invention, the attenuation unit is furthermore designed such that the attenuation is performed by means of an optically active crystal, based on an effect from at least one of the groups of electro-optical effects, acousto-optical effects, and magneto-optical effects; in particular wherein the attenuation unit is designed such that a hysteresis effect in the optically active crystal is calibrated automatically, in particular progressively.

Optical crystals have the capability of rotating the oscillation plane of linearly polarized light during the passage through the crystal. The cause of this optical rotation capability is based in the case of solid materials in a helical crystal structure, in the case of liquids, such as liquid crystals, in a helical structure of the molecules themselves. The rotation capability is dependent on the thickness of the layer which is passed through, the wavelength of the light, and the temperature. In principle, left-rotating and right-rotating crystals are to be differentiated. Optically non-active crystals can become optically active by application of an external magnetic field (for example, magneto-optical Kerr effect, Faraday effect).

Compared to liquid crystals, (solid) optical crystals are somewhat more robust with respect to environmental influences, in particular temperature influences, and can be operated, for example, without noticeable function losses over a large temperature range, for example, between −20° C. and 50° C., without the optical properties thereof thus strongly varying. Moreover, the switching speed is faster by multiple orders of magnitude in optical crystals than in liquid crystals. Setting speeds of less than 1000 ns may be achieved using solid-state crystals, which is not achievable using liquid crystals.

The attenuation unit according to the invention therefore has a functional relationship between attenuation factor and electrical activation, wherein the functional relationship is known over a temperature range between −20° C. and 50° C., in particular between −40° C. and 70° C.

For example, the transmitting unit periodically emits signals at an interval of 1000 ns. Signals can be single pulses or pulses having a coding pattern, in the simplest case a burst impulse sequence consisting of N pulses at an interval of 5 ns, for example. A distance measuring point typically consists of 1 to 10,000 received pulses.

Transmitting and receiving are performed continuously during the scanning of an object; wherein the attenuation unit according to the invention is activated continuously from signal to signal and adjusted if necessary, so that the receiving unit is supplied with a received signal having an amplitude in the calibrated dynamic range. The control of the attenuation unit is always performed in each case by the analysis of a preceding transmitted signal, especially a single preceding signal pulse. If multiple transmitted signals (for example, 100 transmitted pulses) are taken for the distance measurement, sufficient optimally conditioned signals (for example, 99 transmitted pulses) still remain available for the distance measurement, which can be averaged, for example. The distance measuring device can certainly be designed so that there is always a first transmitted signal for the signal setting and at least one subsequent transmitted signal for the optimum determination of the distance. If two or more laser signals are thus accumulated for a measurement result, this method is then typically completely sufficient.

Diverse distance measuring methods are known, such as threshold value methods, phase difference methods, or high-frequency signal direct sampling (waveform digitizing, WFD). These various technological methods for distance measurement do also differ at the transmitter, but the essential difference is at the receiving and analysis unit.

At the transmitter, for example, it is to be decided whether and how the signals are coded and which requirements are to be achieved with the highest degree of fulfillment for the measuring device. In contrast, at the receiver, the differences of the distance measuring methods are more pronounced. A phase measuring unit already transforms the gigahertz frequencies into a lower frequency range shortly after the photodetector and digitizes the distance measuring signals using a slow analog-to-digital converter, to then supply these signals to an analysis unit. In a distance measuring unit according to the direct sampling method, in contrast, the high-frequency signal is supplied directly to a filter block and sampled using the fastest possible A/D converter. The correspondingly high rate of the digitized signal values is applied, for example, to an FPGA, which carries out the signal processing such as signal search, decoding, and distance determination. A distance measuring unit according to the threshold value method is distinguished by a bandwidth of the received signal which is often even higher than that of the two preceding methods and detects the distance measuring signal by means of a threshold value discriminator, which relays trigger events with picosecond accuracy to a time measuring device. The latter generally comprises a counter and a time interpolation device (time-to-digital converter, TDC).

Because the various distance measuring methods comparatively differ quite little at the transmitter, a device according to the invention for signal control and amplitude adaptation in the transmitting channel of the laser distance measuring module is very advantageous.

One special advantage of the invention is in particular that the signal controller is connected at the transmitter. The transmitted beam is generally spatially diffraction-limited, i.e., monomodal with respect to wave optics and thus suitable for light guiding in monomodal fibers.

Furthermore, the polarization is often also defined at the transmitter, which significantly reduces the complexity of a corresponding transmitter-side attenuation unit.

One essential advantage of the invention is that the transmitted light can be guided in monomodal fibers.

Diverse attenuation units having nanosecond switching times are known from the remote technical field of telecommunications and it is therefore also a part of the invention that these fiber-optic components can be used for distance measurement by means of suitable technical adaptations.

Alternatively, thanks to the monomodal nature, for example, in addition to geometrical-optical attenuation principles, interferometric attenuation principles can also be used, wherein such an attenuation unit could be designed, for example, such that the beam guiding of the laser measuring radiation is performed in an aberration-free and/or diffraction-limited manner in the transmitting channel. This enables, for example, the construction of a very compact electro-optical attenuation unit based on planar light guide technology, for example, by means of Mach-Zehnder interferometer cells and/or electro-optical directional couplers.

Alternatively to the use of optically active crystals, and in particular also comparatively robust with respect to external influences, for example, an attenuation unit would be designed such that the attenuation is based on a micro-opto-electromechanical system, referred to as MOEMS hereafter.

In one embodiment, the attenuation unit is designed such that it is operated at an attenuation setting rate defined by a setting time between two successive attenuation factors of less than 1000 ns, in particular less than 300 ns, and a settable ratio between a minimum and a maximum attenuation factor of a factor of $10^3$ or more, in particular $10^4$.

The transit time, which acts directly on the distance measurement and introduces a corresponding distance error, and which is dependent on the set attenuation, often proves to be problematic. The stronger the attenuation, typically the longer the effective transit time of the laser measuring radiation through the attenuation unit, which can increase in comparison to the open state by up to 10 ps, for example. Depending on the construction of the attenuation unit, for example, parasitic light is increasingly generated with an increasing attenuation factor, which couples a part of the light pulse after a time delay into the output port via multiple reflections, for example. This effect can be partially minimized by corresponding fixed attenuation elements and absorber elements. Thanks to the rapid switching times, which can be uniquely calibrated, of optically active crystals (and/or alternatively of MOEMS elements), the transit time can additionally also be precalibrated as a function of the attenuation.

In one special embodiment of the invention, the laser distance measuring module and the attenuation unit are therefore designed such that a distance error, in particular based on a variable transit time, is automatically corrected as a function of the attenuation factor, in particular progressively.

A further embodiment describes an attenuation unit which is designed as polarization-free.

A particularly advantageous embodiment based on the electro-optical effect relates to a measuring device in which the optically active crystal of the attenuation unit is an electro-optically active crystal, in particular an optical nonlinear crystal and/or a phase-shifting crystal, wherein the attenuation unit is designed such that it comprises at least a first polarizing beam splitter for generating a first and a second partial beam each having different polarization, in particular a polarizing parallel beam splitter or a Savart plate; and the electro-optically active crystal to change the polarization of at least the first partial beam by means of the electro-optical effect; and a second polarizing beam splitter to guide the two partial beams back together, in particular a polarizing parallel beam splitter or a Savart plate.

Electro-optical, variable attenuation units have the advantage over electromechanically activated elements of very short switching times (down to several nanoseconds). The signal amplitude is set by means of the correct selection of the optical transmission or optical density by means of an electronically activatable optical element. Optical nonlinear double-refracting crystals and phase-shifting crystals are suitable as electronically activatable optical elements.

A further special embodiment is based on the acousto-optical effect and describes a measuring device, wherein the optically active crystal of the attenuation unit is an acousto-optically active crystal and the attenuation unit is designed such that it comprises at least the acousto-optically active crystal to generate an intensity change between the incident laser measuring beam and a partial beam deflected by diffraction by means of an acousto-optical diffraction effect as a function of an applied activation voltage and an order of diffraction; and a monitoring unit to compensate for the temperature dependence of a diffraction angle by means of tracking of a high frequency which generates the acoustic wave; in particular wherein the first order of diffraction is used for the attenuation of the deflected beam.

Because of limited diffraction efficiency, the achievable range of the settable radiation intensity at the output of the first order of diffraction is substantially more extensive than that at the zero order. This channel is therefore preferably used for the attenuation function and a light absorber element is typically located in the continuous channel (zero order beam).

The Faraday effect refers to the rotation of the polarization direction of an electromagnetic shaft in a dielectric medium under the influence of a magnetic field. Optical elements which use the Faraday effect to change the polarization direction of light are referred to as Faraday rotators.

A further advantageous embodiment relates to a measuring device based on the magneto-optical Faraday effect, wherein the optically active crystal is a magneto-optically active crystal and the attenuation unit is designed such that it at least comprises: a first polarizing beam splitter for generating a first and a second partial beam each having different polarization; the magneto-optically active crystal to generate a spatial rotation of a polarization vector of at least the first partial beam by means of a magneto-optical Faraday effect, as a function of a set magnetic field; and a second polarizing beam splitter to generate an output signal based on at least the modified first partial beam; in particular wherein the attenuation unit furthermore comprises at least one element of the following groups: an optically active crystal, in particular a crystal which rotates a polarization plane by 45°; and an absorber element to reduce internal scattered light, in particular to reduce light which does not contribute to the output signal; wherein a runtime difference between the first and the second partial beam less than 1 ps is ensured.

Typical Faraday rotators are, for example, optically transparent dielectric solids (such as crystalline quartz or terbium-containing glasses), which generate a material-specific rotation (Verdet constant) of the polarization plane of the light in a homogeneous magnetic field. The material terbium titanate, which is novel for this application, displays, for example, a high transparency for light from the visible to the IR range and a higher Verdet constant than the presently used materials, for example, TGG or terbium-containing glasses. Terbium titanate has the chemical formula $Tb_2Ti_2O_7$ and can be produced using crystal cultivation methods from melts having a composition similar or identical to the stoichiometric composition or also using ceramic methods.

In one special embodiment, the measuring device according to the invention furthermore comprises at least one element of the following groups: a calibration unit for calibrating a transit time as a function of the set attenuation factor; a fixed attenuation unit for reducing multiple reflections; a fiber having an angled fiber end, in particular at an angle of 8°, for reducing multiple reflections; an absorber element for extinguishing the deflected light and for generating a constant transit time independently of the set attenuation factor; and a circulator upstream from an optically active crystal for absorbing back reflections.

Alternatively to the present invention, for example, a measuring device having an attenuation unit could be designed such that the attenuation unit comprises at least: a first polarizing beam splitter for generating a first and a second partial beam each having different polarization, in particular a polarizing parallel beam splitter or a Savart plate; a first and a second Mach-Zehnder interferometer cell in the first and second partial beam, wherein an intensity change of the first and second partial beams is generated by means of a change of the optical phase inside the first Mach-Zehnder interferometer cell and/or a change of the optical phase inside the second Mach-Zehnder interferometer cell; and a second polarizing beam splitter to guide the two partial beams back together, in particular a polarizing parallel beam splitter or a Savart plate; wherein a runtime difference between the first and the second beam less than 1 ps is ensured.

Instead of a Mach-Zehnder interferometer cell, furthermore an electro-optical directional coupler could be used, i.e., wherein the attenuation unit is designed such that it at least comprises: a first polarizing beam splitter for generating a first and a second partial beam each having different polarization, in particular a polarizing parallel beam splitter or a Savart plate; a first and a second electro-optical directional coupler in the first and second partial beam, wherein an intensity change of the first and/or the second partial beam is generated by means of a change of the optical transmission of the first electro-optical directional coupler and/or a change of the optical transmission of the second electro-optical directional coupler; and a second polarizing beam splitter to guide the two partial beams back together, in particular a polarizing parallel beam splitter or a Savart plate; wherein a runtime difference between the first and the second partial beam less than 1 ps is ensured.

As a further alternative, the attenuation unit could furthermore be designed such that it comprises a micro-opto-electromechanical system, referred to as MOEMS hereafter, which comprises at least: an input channel for the laser measuring radiation, a lens, a rotatable mirror, and means for setting different angle positions of the mirror and an output channel, which is designed as an optical fiber, for the laser measuring radiation reflected at the rotating mirror; wherein a light spot is generated by means of the lens and a reflection on the rotating mirror, which is controlled by the rotation of the mirror and a set angle position of the mirror via a fiber core of a fiber of the output channel, whereby a different light power of the incident laser measuring radiation is coupled into the fiber. If MOEMS elements are used, for example, the low electrical power consumption is very advantageous, whereby practically no temperature-induced drift due to intrinsic heating exists. However, the switching times have heretofore been somewhat slower than upon the use of optically active crystals. However, the switching speed can be increased, for example, by a focal length of the optical unit, which is lengthened by at least one order of magnitude in comparison to conventional elements, before the output channel, whereby the switching time is shortened to the same extent.

The measuring device according to the invention for scanning uncooperative objects, in particular natural objects, moreover also for scanning cooperative objects such as reflectors, having an electronic laser distance measuring module, will be described in greater detail solely by way of example hereafter on the basis of exemplary embodiments which are schematically illustrated in the drawings. Identical elements are identified with identical reference signs in the figures. The described embodiments are generally not shown to scale and they are generally also not to be understood as a restriction.

BRIEF DESCRIPTION OF THE DRAWINGS

In the specific figures

DETAILED DESCRIPTION

Figure 1A:
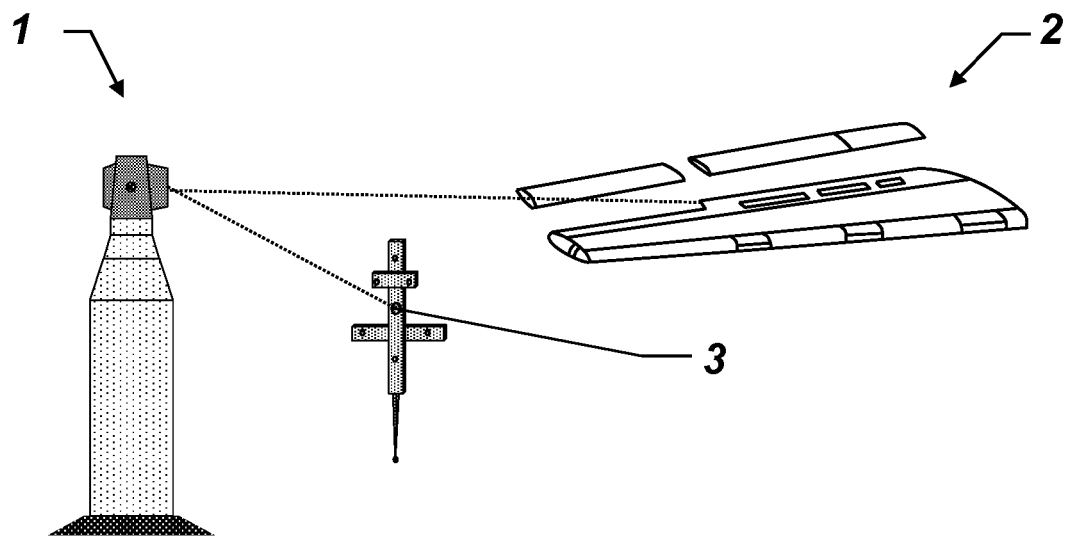
FIGS. 1a-d: show exemplary measuring devices having a laser distance measuring module, for example, laser tracker for reflector-free measurements (a), theodolite with and without reflector (b), LIDAR scanner (c), and a 3D laser scanner for preparing a 3D model of a space (d)
Figure 1B:
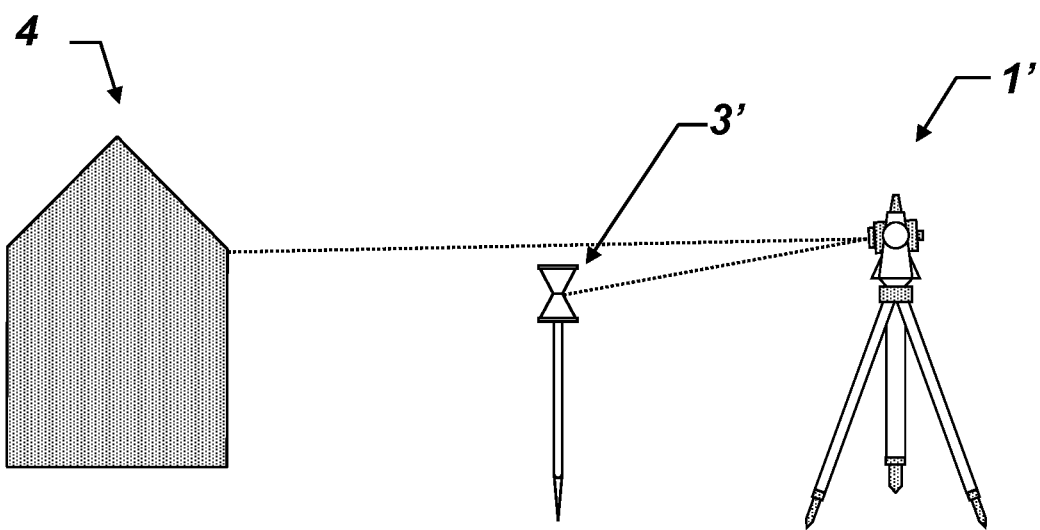
Figure 1C:
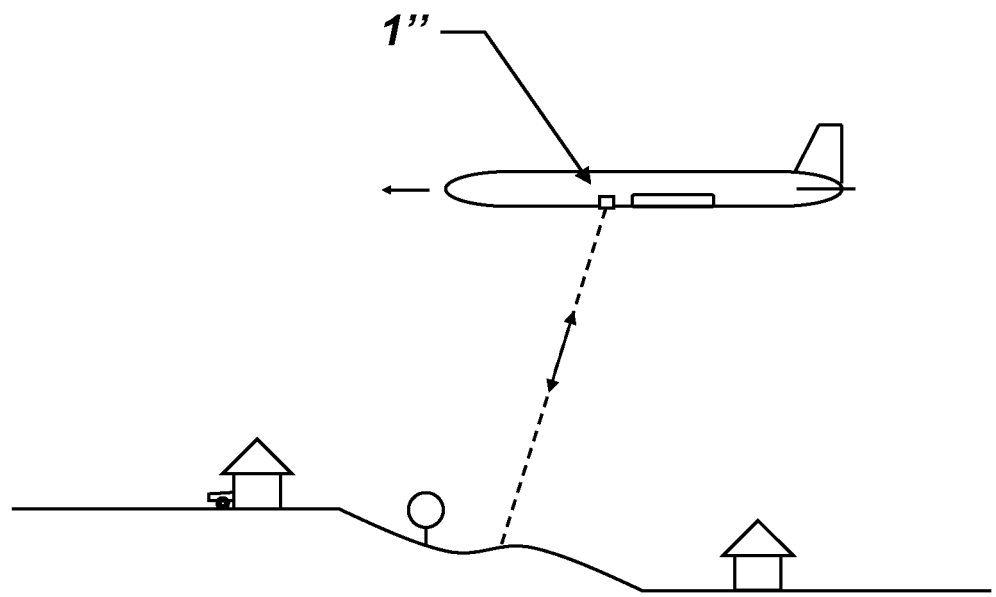

FIG. 1 shows exemplary measuring devices having a laser distance measuring module. Modern laser trackers 1 as shown in FIG. 1a are the focus of the invention, which scan surfaces of produced objects 2 and natural objects using a scanning laser beam and determine the spatial dimensions thereof in the form of coordinates. Measurement is often also performed in this case by means of a reflective target, for example, by means of a measuring probe attached to an object to be measured, having a reflector 3 for tracking using the laser distance measuring module of the measuring device 1, wherein additional signal components for 6DoF (six degrees of freedom) determination of the location of the object to be measured are attached to the measuring probe, which are acquired, for example, by means of a 6DoF camera of the measuring device. For several years, theodolites 1' have also been on the market, shown in FIG. 1b, which can acquire a reflector-free distance measurement, for example, on a natural object 4, at a speed in the kilohertz range like a scanner. Geodetic total stations or theodolites often measure by means of special reflection targets 3', in particular reflection prisms, but also in the case of theodolites, the demand exists more and more for measuring natural objects 4 having partially glossy and therefore reflective surfaces. This places a special demand on the measurement technology, namely that the measuring signal varies massively in strength depending on the alignment of the instrument in relation to the surface. The measuring beam which is partially reflected on the object either hits the receiving optical unit or misses it. This can result in signal differences of more than a factor of 100 (20 dB). Moreover, the surfaces can also be light or dark, which additionally generates a signal variation of typically a factor of 30 (15 dB). Gloss, reflectivity, and changing distance require signal dynamics of greater than 300,000 (55 dB) from the measuring instrument, which is not achievable using existing means and measuring devices. This particularly also applies, for example, to applications in the LIDAR field, as shown in FIG. 1c, wherein very different surfaces are scanned in rapid succession by a LIDAR scanner 1", for example, highly reflective water surfaces in relation to diffusely scattering vegetation.

Figure 1D:
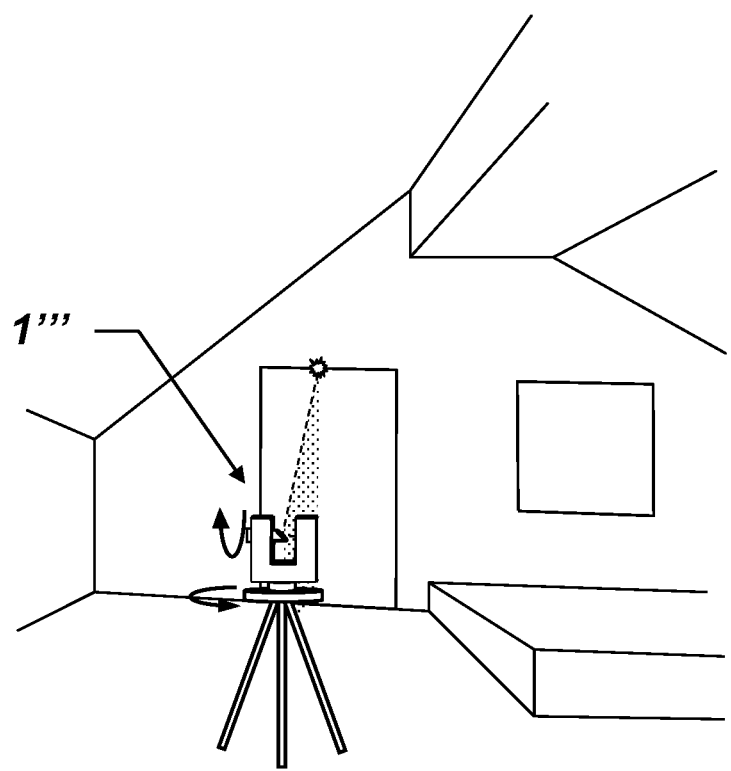

The management of the high dynamics is to be provided at a high measuring speed compatible with the respective scanner. Objects made of metal or plastic, but also painted surfaces, are almost entirely slightly to strongly glossy. Laser light is therefore primarily deflected in the direction which mirrors the angle of incidence. This has the effect that the light component for diffuse reflection is small and therefore very little light is reflected back to the measuring device. In contrast, if the laser beam is incident almost perpendicularly on the surface, the opposite occurs, and almost all light is incident on the receiver. For example, also in the field of indoor measurements, for example, for generating a 3D model of a space using a 3D laser scanner 1'" as shown in FIG. 1d, or in the field of industrial measuring for checking artificially manufactured components, these extreme beam alignments alternate in rapid sequence, in particular when scanning tubes, edges, or boreholes in a plate. To achieve a preferably continuous measurement of such surfaces, a distance measuring module having sufficiently high dynamics is also required, wherein the scanning is to be performed at conventional rapid speed, because of which the transmitting signal has to be settable correspondingly rapidly.

Figure 2:
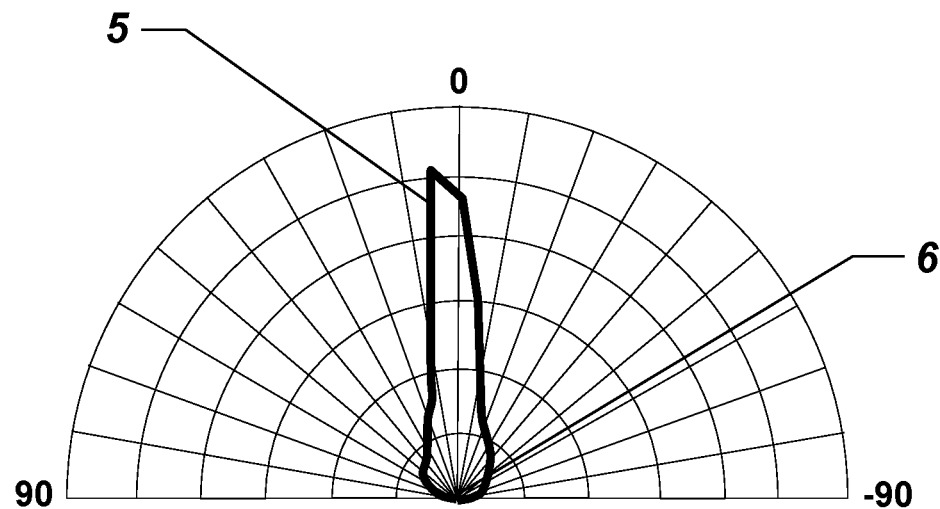
FIG. 2: shows an angle-dependent scattering characteristic of typical target objects.

FIG. 2 shows a typical scattering characteristic of a plate made of black plastic. The curve 5 represents the reflectivity in the function of the scattering angle (indicatrix) for the case of a laser beam which is incident almost perpendicularly. In the figure, the reflectivity is greater the farther the curve 5 is from the center 6 in the radial direction. The scattering angle is shown in the azimuth direction in the figure, from 90° on the left in the figure clockwise to 0° (on top in the figure) and to −90° (on the right in the figure). These are often not white surfaces, but rather dark surfaces, which display the reflective effect. In the example shown, the integrated reflectivity is only approximately 3.5%. In addition, the signal strength decreases at angles of incidence greater than 45° to less than 10% in relation to the reflective direction (approximately 3° here). In this exemplary case, the maximum back reflected power at the glossy angle (3°) is 150% in relation to a diffuse white surface and decreases rapidly with increasing measuring angle. At 70°, the signal is approximately 20× less and is only still approximately 7%. The receiving signal can change in this case from measuring point to measuring point by at least this order of magnitude, which is to be adapted using a variable attenuation unit in the transmitting channel of the laser distance measuring module. The attenuation unit has electrically activatable settings, which are provided either in discrete steps or in continuous form.

Figure 3:
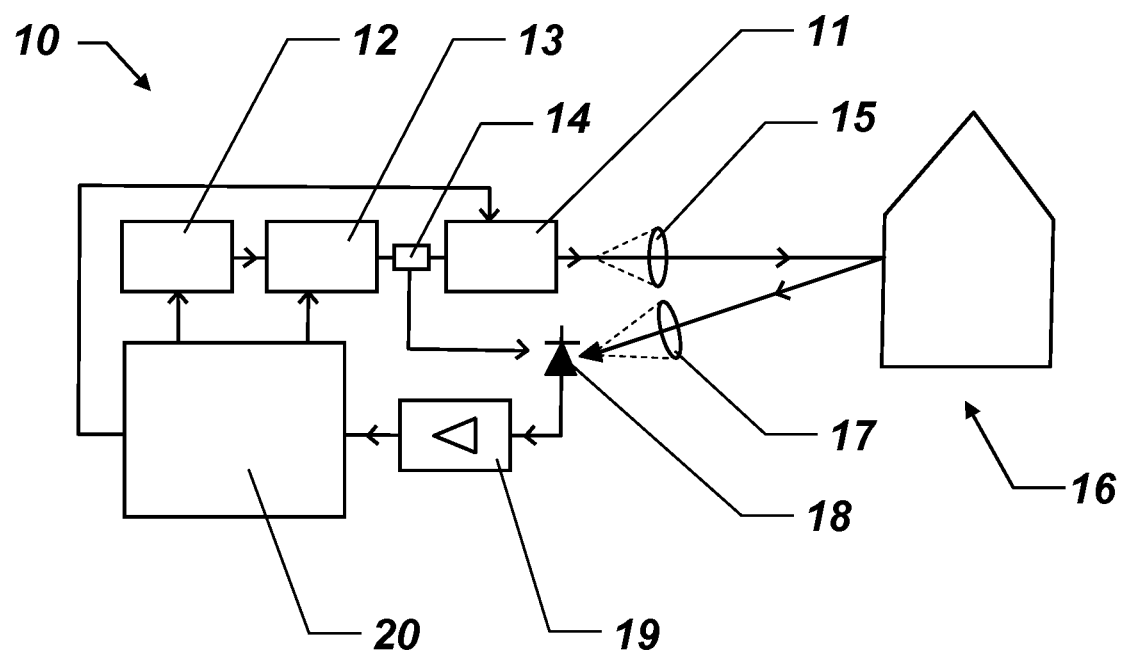
FIG. 3: shows a block diagram of a laser distance measuring module according to the invention.

FIG. 3 shows a block diagram of a laser distance measuring module 10 according to the invention having a rapid attenuation unit 11 according to the invention in the transmitting channel. The transmitting channel consists here of a seed unit 12, consisting of an electronic driver stage and a laser diode or a super-luminescent LED, an optical amplifier 13, for example, an erbium-doped fiber amplifier, a beam splitter 14 to deflect a part of the generated radiation as referenced radiation for the receiving channel, a settable optical attenuation unit 11 according to the present invention, and an exit optical unit 15. The emitted laser measuring beam is reflected on a target object 16 and detected in the receiving channel of the distance measuring module 10. The receiving channel consists of an entry optical unit 17, a photodiode 18, and receiving electronics, consisting here of an amplifier 19 and a time measuring unit 20.

Typical measuring speeds of present scanners are 1 MHz point rate. The optical measuring beam is typically moved by means of a scanning movement in a grid at rapid speed over the surface of the object to be measured. The strength of the received signal changes from measuring point to measuring point in this case. Even with uniform intervals, the amplitude can change in a range of a factor of 100,000 (50 dB), this is above all because of local reflections. With a variable attenuation unit in the transmitting channel, in the event of beam reflections on partially reflective surfaces, the distance measuring signal can be optimally set from measuring point to measuring point for the receiving unit.

The measuring speeds of scanning laser trackers are, because of the higher measurement accuracies in the micrometer range, somewhat slower at 1 to 100 kHz, in contrast, the laser firing rate is rather higher in the two-digit megahertz range. By means of a VOA in the transmitting channel, a signal variation up to a factor of 10,000 can also be compressed here, so that signal variations of substantially less than 100 occur on the receiving unit and a higher measurement accuracy is thus achieved.

The operating point of the receiving electronics can be designed, for example, such that in the case of the setting of the attenuation unit at maximum transmission and reflection on a black object having albedo 10%, the received signal level is set at 75% of the dynamic range of the receiving electronics. If a variable attenuation unit is used having attenuation dynamics of a factor of 10,000 (40 dB), an accurate distance measurement can therefore still be achieved on objects having a reflectivity which is higher by a factor of 1000 in comparison to a white surface. Reflection target marks and retroreflective films and marks can thus also still be measured accurately.

Figure 4:
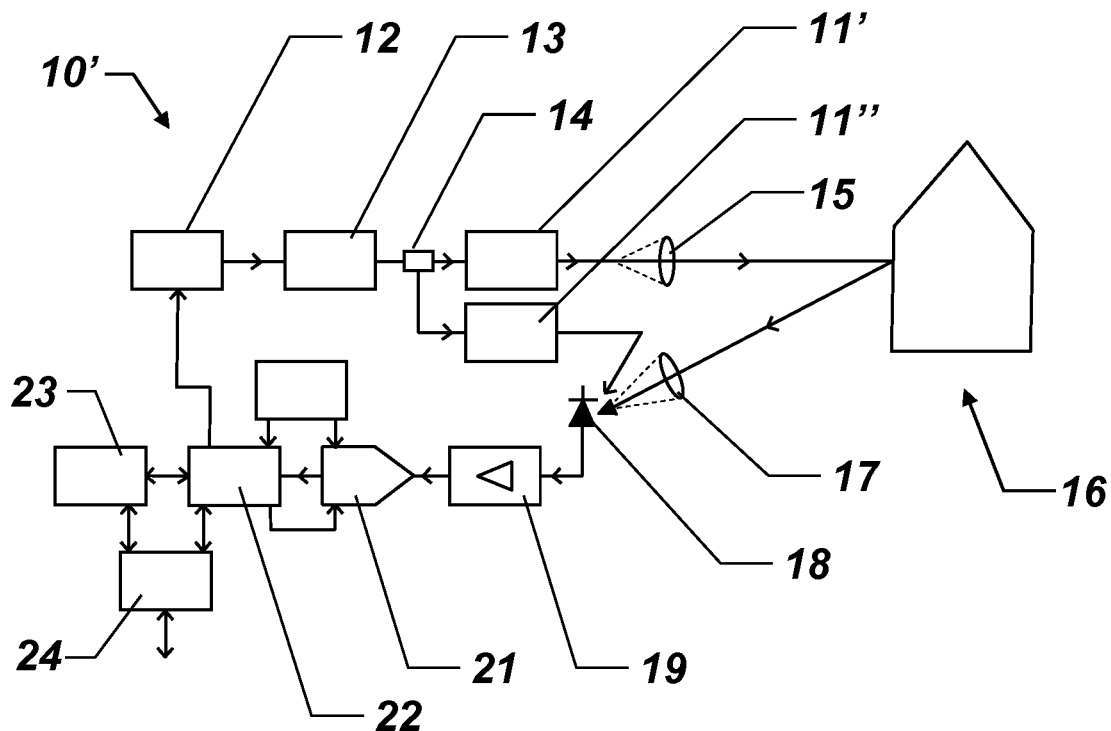
FIG. 4: shows a block diagram of a laser distance measuring module according to the invention according to the WFD principle.

FIG. 4 shows a block diagram of a distance measuring module 10' according to the invention according to the WFD principle ("wavefront digitizing"). The transmitting channel again consists of a seed unit 12, an optical amplifier 13, a beam splitter 14, a first settable optical attenuation unit 11' according to the present invention, and an exit optical unit 15. In addition, a second settable optical attenuation unit 11" is shown in the internal reference channel adjacent to the first settable optical attenuation unit 11 in the measuring channel. The attenuation unit in the internal reference channel 11" can be of slower speed, because it is primarily used for the optimum setting of the operating point for the start signal and for a possible calibration of the transit time of the first attenuation unit 11' as a function of the attenuation factor and/or temperature. The transmitting unit can primarily be constructed from fiber-optic components consisting of monomodal fibers.

The received measuring signal is detected via an entry optical unit 17 by a photodiode 18, for example, an avalanche photodiode (APD) and supplied after a low-noise amplifier and filter unit 19 directly to an analog-to-digital converter 21. The digital signal data are subsequently relayed to an FPGA unit 22, which carries out the determination of signal parameters such as object distance, signal strength, signal noise, etc., but also controls the seed unit 12 and the attenuation unit 11', 11" according to the invention. In the example shown, the signal is furthermore relayed from the FPGA unit 22 to a processor unit 23 and an interface unit 24 for additional analysis and evaluation.

Figure 5:
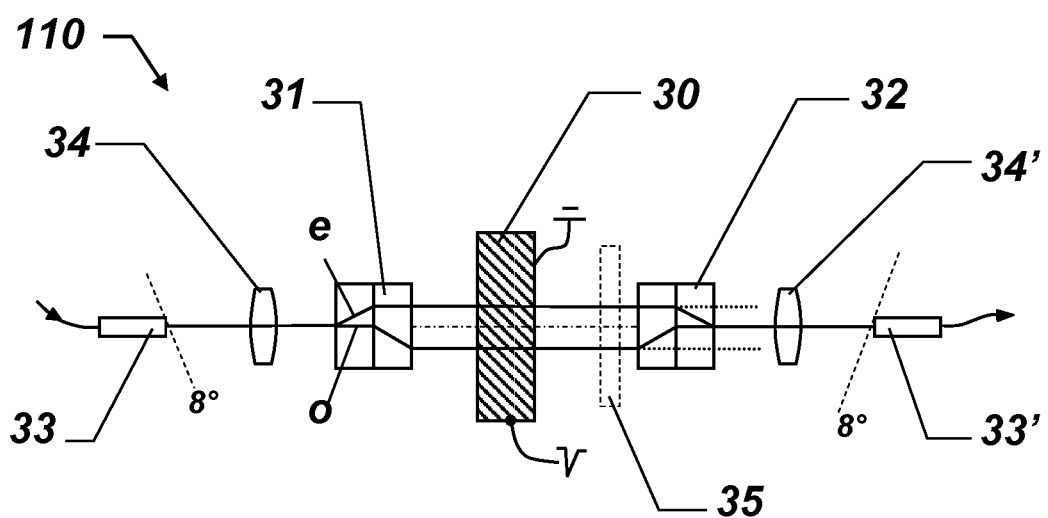
FIG. 5: shows an exemplary embodiment of an attenuation unit according to the invention according to the electro-optical principle.

FIG. 5 shows an exemplary embodiment of an attenuation unit 110 according to the invention according to the electro-optical principle, in combination here with beam guiding inside an optical fiber, preferably monomodal fibers, with associated fiber exit and fiber entry couplings 33, 33' having a corresponding collimation optical unit 34, 34'.

Electro-optical, variable attenuation units have the advantage over electromechanically activated elements of very short switching times (down to several nanoseconds).

The signal amplitude is set by means of the correct selection of the optical transmission or optical density by means of an electronically activatable optical element. Optically nonlinear double-refracting crystals and phase-shifting crystals 30 are suitable as electronically activatable optical elements. Freedom from polarization is achieved by the separation of the beam into two (complementary) polarization directions ("e light" and "o light") by means of a first polarizing beam splitter 31. Known beam splitters are, for example, polarizing, parallel beam splitters (polarization beam displacer) or the Savart plate. Both beam paths are modified by means of an electrostatically activatable optical nonlinear element 30 (Pockels or Kerr effect), wherein a part of the e light is transformed into o light and vice versa. Modified light is then no longer coupled by means of a second polarizing beam splitter 32 into the fiber, which results in beam attenuation.

The transit time, which is dependent on the set attenuation, has proven to be problematic. The stronger the attenuation, the longer the effective transit time becomes, which can increase by up to almost 10 ps in comparison to the open state. With increasing attenuation, the light is guided away from the fiber entry coupling 33', which can mutate into parasitic light, however, which is then nonetheless coupled partially into the fiber via multiple reflections after a time delay. The transit time is calibrated as a function of the attenuation as a countermeasure, for example. Multiple reflections can in any case be minimized by means of a fixed attenuator 35 and/or by means of angled end faces of the fiber couplings 33, 33'. The fiber ends of the fiber couplings are typically angled by approximately 8°. In addition, back reflections can be absorbed by means of an upstream circulator element. Alternatively, absorber elements (not shown) can be placed at the points where the beams deflected away are incident, a constant transit time (<0.3 ps) can thus be achieved independently of the set attenuation.

The optical path lengths of the two beams e and o are preferably of exactly equal length, otherwise extremely small asymmetries of the attenuation in the assigned light paths could result in additional changes of the transit time.

Figure 6:
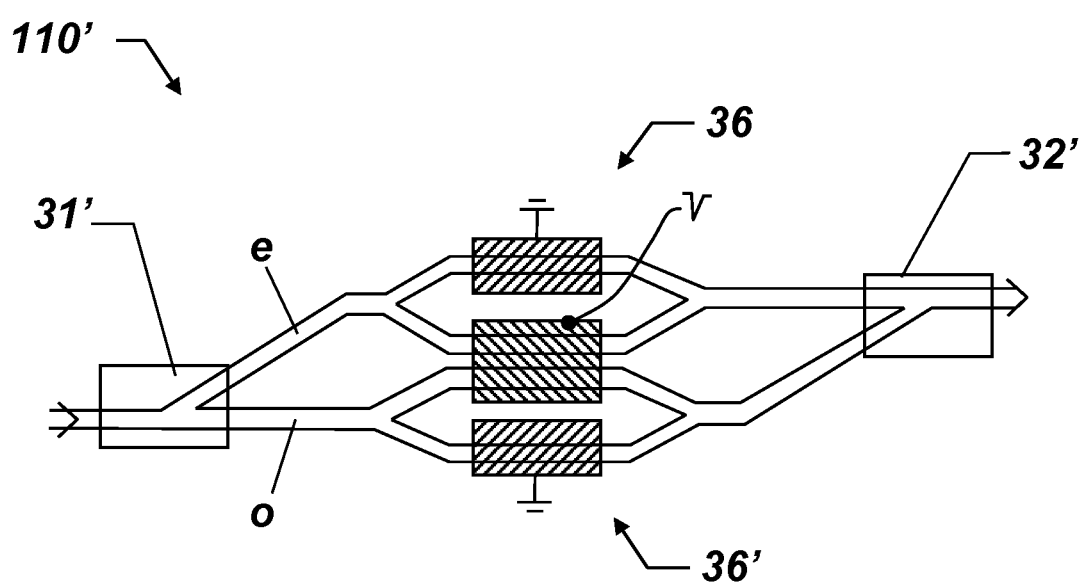
FIG. 6: shows an exemplary embodiment of a polarization-free alternative attenuation unit according to the electro-optical principle having a Mach-Zehnder interferometer.

FIG. 6 shows an alternative electro-optical attenuation unit 110', formed using a Mach-Zehnder interferometer (MZI). This electro-optical attenuation unit, which is also polarization-free, is constructed in planar light guide technology. Light inputs and outputs are typically glass-fiber-coupled. The input light is again allocated by means of a first polarization splitter 31' into the two (complementary) polarization components e and o. Subsequently, a Mach-Zehnder interferometer 36, 36' follows in each case, whereby the power at the output can be set by means of a voltage. In an integrated Mach-Zehnder interferometer, the optical phase is changed by applying a voltage in one of the two arms of the interferometer, which results in an intensity change at the interference point of the two arms. Instead of Mach-Zehnder interferometer cells 36, 36', electro-optical directional couplers (not shown) can also be used. Subsequently, the modified e and o components are guided back together by means of a second polarization splitter 32', wherein it is particularly important that the runtimes via the various light channels are identical in the subpicosecond range.

Figure 7:
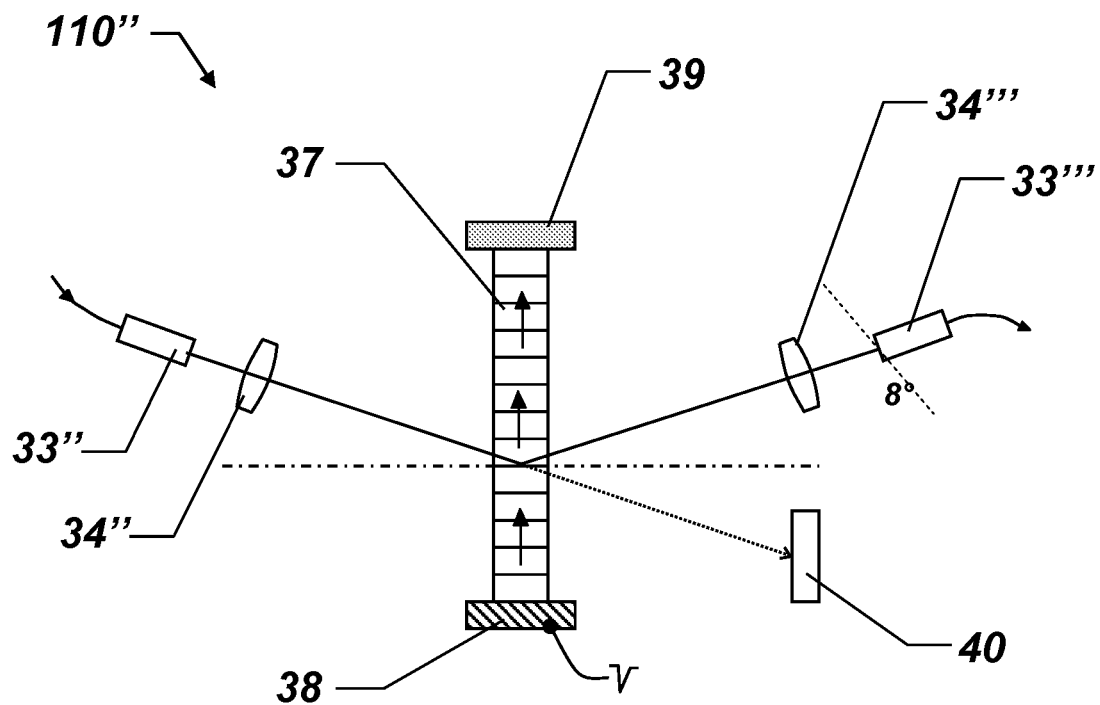
FIG. 7: shows an exemplary embodiment of an attenuation unit according to the invention according to the acousto-optical principle.

FIG. 7 shows a further embodiment of an attenuation unit 110" according to the invention, formed here by means of an acousto-optical modulator having fiber-optic terminals, i.e., having associated fiber exit and fiber entry couplings 33", 33'" and a corresponding collimation optical unit 34", 34'". The core of this attenuation unit is an acousto-optically active crystal 37 having two outputs. In this case, an optical grating (Bragg grating) is generated in the crystal 37 using soundwaves, on which an incident light beam is diffracted and simultaneously shifted in its frequency. A piezo element 38 is typically attached to one end of the crystal to generate the soundwaves. At the other end, a sound absorber element 39 is typically located, to avoid or minimize reflections and standing waves. At the output without deflection (zero-order beam), the injected light exits if no activation voltage is applied, and the light power increases with the amplitude of the activation voltage at the output in the case of the first-order diffraction. Because of limited diffraction efficiency, the achievable range of the settable radiation intensity at the output of the first-order diffraction is substantially higher than that in the case of the zero order. This channel is therefore preferably used for the attenuation function and a light absorber element 40 is typically located in the through channel (zero-order beam).

To also achieve a transit time independent of the set attenuation in this type of an attenuation unit according to the invention, a fiber coupling 33'" having an angled entry surface (typically 8°) is advantageous. The temperature dependence of the diffraction angle is tracked by means of tracking of the high frequency which generates the acoustic wave, this ensures that the coupling into the fiber is optimal.

Figure 8:
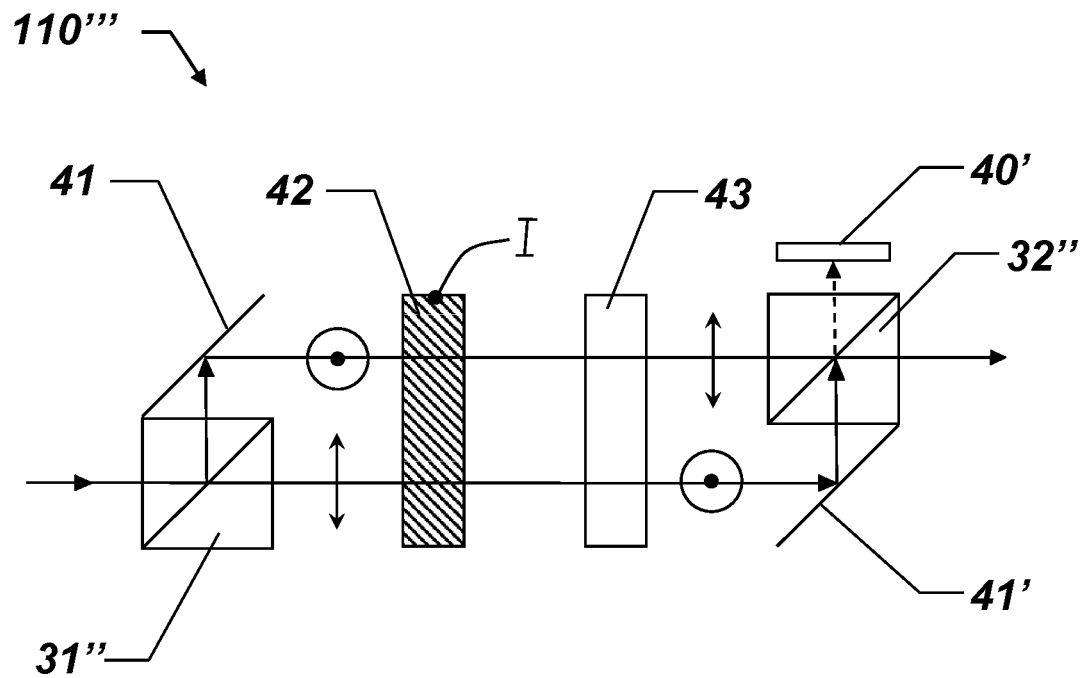
FIG. 8: shows an exemplary embodiment of an attenuation unit according to the invention according to the magneto-optical (Faraday) principle.

FIG. 8 shows an embodiment according to the invention of an attenuation unit 110'", constructed according to the Faraday principle. Known assemblies which are based on the magneto-optical Faraday affect (based on the Zeeman effect) are optical isolators and circulators. The effect is based on circular double refraction, the strength of which can be set by applying a magnetic field. Circular double refraction causes a spatial rotation of the polarization vector about the light propagation axis. This effect can be used to implement an attenuation unit having rapid switching speed and high signal dynamics. Proceeding from the topologies of isolators or circulators, the light power at the output may be set by setting the magnetic field strength.

The figure shows a magneto-optical attenuation unit 110'", which is derived from a topology of a circulator. Non-polarized light at the input is split by a first polarizing beam splitter 31". Both beams pass by means of mirror elements 41, 41' through a controllable magneto-optical solid 42 (Faraday rotator having controllable magnetic field by application of a current) and an optically active crystal 43, wherein the latter rotates the polarization plane by 45°. Using a second polarizing beam splitter 32", the two beams are deflected depending on the respective polarization direction in the direction of the output channel or in the direction of an absorber element 40', which eliminates non-relayed light and scattered light.

Depending on the dimensioning of the attenuation element 110'", the components can be arranged differently. An implementation without the optically active crystal 43 is also possible in particular. The topology shown in the figure functions as follows: A positive current generates a magnetic field in the radiation direction and rotates the polarization vectors by +45°. The active crystal 43 (optical rotator) rotates the polarization direction by +45° further to 90°. The second polarizing beam splitter 32" therefore conducts the light of both channels to the output. The illustrated arrangement has maximum transmission. A negative current, in contrast, generates a magnetic counter field and rotates the polarization vectors by −45°. The active crystal 43 rotates the polarization direction by +45° back to 0°. The second polarizing beam splitter 32" now conducts the light of both channels back to the absorber and the attenuation unit 110'" is in the state of maximum attenuation.

It is again particularly important that the runtimes via the two light channels are identical in the sub-picosecond range.

Figure 9:
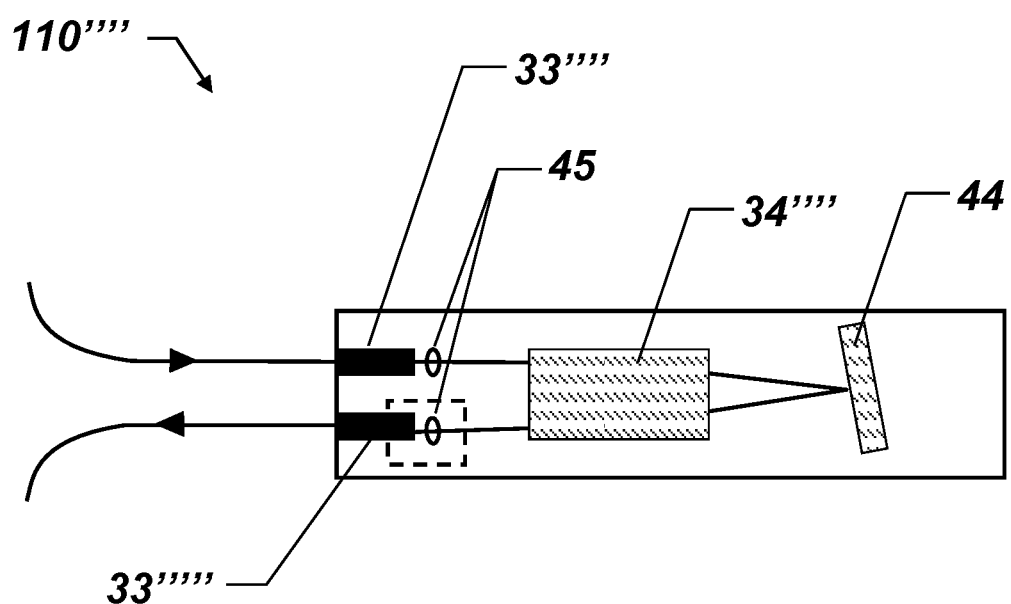
FIG. 9: shows an exemplary embodiment of an alternative attenuation unit based on MOEMS technology.

FIG. 9 finally shows an embodiment of an alternative attenuation element 110"" based on the MOEMS technology (micro-opto-electromechanical systems).

In this exemplary example of an MOEMS, a mirror 44 is continually rotated with a high repetitive angle/voltage relation. The attenuation element 110"" furthermore contains a fiber exit and fiber entry coupling 33"", 33'"" with associated collimation optical unit 34"". The deflection of the mirror 44 moves the imaged light spot 45 over the fiber core of the fiber coupling 33'''' and therefore controls the light power coupled into the fiber. It is also important here that the light which is not guided in the fiber core is kept away from the beam axis or is absorbed as rapidly as possible, so that the effective signal runtime is not interfered with by the attenuation element 110''''.

MOEMS elements are operated at voltages of typically 0 to 5 V, wherein the switching times have previously been slower than in the above-mentioned examples, however, typically approximately in the order of magnitude of the switching times of the optical fiber amplifiers. Furthermore, the characteristic curve of the attenuation of the analog component generally requires a temperature correction, for example, if the attenuation factor is to be set in open-loop operation. In addition to a temperature sensor, the MOEMS attenuator can be equipped by means of a collimation optical unit 34'''' having unusually long focal length. Shorter switching times are thus achieved. A longer focal length of the collimation optical unit 34'''' has the effect, for example, that the rotating mirror 44 can be farther away from the fiber couplings 33'''', 33''''' and therefore a small angle change of the rotating mirror 44 already results in a comparatively large deflection of the imaged light spot 45 with respect to the fiber core of the fiber coupling 33''''. At the same time, the rotating mirror 44 is provided with a rear damping element (not shown), to additionally optimize the positioning time. The low electrical power consumption is also very advantageous, whereby practically no temperature-induced drift due to intrinsic heating exists.

What is claimed is:

1. A measuring device for scanning uncooperative objects, the measuring device comprising:
    an electronic laser distance measuring module including:
        an optical transmitting channel having a transmitting unit for generating laser measuring radiation,
        an attenuation unit in the optical transmitting channel for attenuating the laser measuring radiation generated by the transmitting unit, and
        an optical receiving channel having a receiving unit for reflected laser measuring radiation,
    wherein the beam guiding in the electronic laser distance measuring module is implemented by means of a fiber optic,
    wherein, during the scanning, the transmitting unit progressively generates modulated signals having a modulation rate greater than 100 kHz,
    wherein an electrically controllable setting of at least two different attenuation factors is provided,
    wherein the attenuation unit is continuously activatable from transmitted signal to transmitted signal, wherein during the scanning, setting of the attenuation unit is performed using different attenuation factors in such a way that the receiving unit is supplied a received signal having an amplitude in a linear dynamic range of the receiving unit, based on a single immediately preceding received signal pulse or based on multiple successive immediately preceding received signal pulses,
    wherein the attenuation unit is designed such that the attenuation is performed by means of an optically active crystal based on an effect from at least one of the groups consisting of:
    electro-optical effects,
    acousto-optical effects, and
    magneto-optical effects, and
    wherein the attenuation unit has a functional relationship between attenuation factor and electrical activation, wherein the functional relationship is known over a temperature range between −20° C. and 50° C.

2. A measuring device according to claim 1, wherein the optically active crystal is a solid optical crystal and the functional relationship between attenuation factor and electrical activation is known over a temperature range between −40° C. and 70° C.

3. A measuring device according to claim 1, wherein the attenuation unit is configured to operate using:
    the attenuation setting rate defined by a setting time between two successive attenuation factors of less than 1000 ns, and
    a settable ratio between a minimum and a maximum attenuation factor of a factor of $10^3$ or more.

4. A measuring device according to claim 1, wherein the attenuation unit is designed such that a hysteresis effect in the optically active crystal is automatically calibrated.

5. A measuring device according to claim 4, wherein the hysteresis effect in the optically active crystal is progressively calibrated.

6. A measuring device according to claim 1, wherein the laser distance measuring module and the attenuation unit are designed such that a distance error is automatically corrected as a function of the attenuation factor.

7. A measuring device according to claim 6, wherein the distance error is progressively corrected as a function of the attenuation factor.

8. A measuring device according claim 1, wherein the attenuation unit is designed as polarization-free.

9. The measuring device according to claim 1, wherein the optically active crystal is an electro-optically active crystal, wherein the attenuation unit comprises:
    a first polarizing beam splitter for generating a first and a second partial beam each having different polarization, wherein the electro-optically active crystal changes the polarization of at least the first partial beam by means of an electro-optical effect, and
    a second polarizing beam splitter to guide the two partial beams back together.

10. The measuring device according to claim 9, wherein the electro-optically active crystal is an optical nonlinear crystal and/or a phase-shifting crystal.

11. The measuring device according to claim 1, wherein the attenuation unit is designed such that it comprises:
    an acousto-optically active crystal comprising the optically active crystal to generate an intensity change between the incident laser measuring beam and a partial beam deflected by diffraction by means of an acousto-optical diffraction effect as a function of an applied activation voltage and an order of diffraction, and
    a monitoring unit to compensate for the temperature dependence of an angle of diffraction by means of tracking of a high frequency which generates the acoustic wave.

12. The measuring device according to claim 11, wherein the first order of diffraction is used for the attenuation of the deflected beam.

13. A measuring device according to claim 1, wherein the optically active crystal is a magneto-optically active crystal, and wherein the attenuation unit comprises:
    a first polarizing beam splitter for generating a first and a second partial beam each having different polarization,
    a magneto-optically active crystal comprising the optically active crystal to generate a spatial rotation of a polarization vector of at least the first partial beam by means of a magneto-optical Faraday effect, as a function of a set magnetic field, and a second polarizing beam splitter to generate an output signal based on at least the modified first partial beam, wherein a runtime difference between the first and the second partial beam less than 1 ps.

14. The measuring device according to claim 13, wherein the attenuation unit comprises at least one element of the group consisting of:

another optically active crystal, and an absorber element to reduce internal scattered light.

15. The measuring device according to claim 1, wherein the attenuation unit comprises at least one element of the group consisting of:

a calibration unit for calibrating a transit time as a function of the set attenuation factor, a fixed attenuation unit for reducing multiple reflections, a fiber having an angled fiber end, in particular at an angle of 8°, for reducing multiple reflections, an absorber element for extinguishing the deflected light and for generating a constant transit time independently of the set attenuation factor, and a circulator upstream from an optically active crystal for absorbing back reflections.

* * * * *